United States Patent [19]

Mannino, Jr.

[11] 4,071,360

[45] Jan. 31, 1978

[54] METHOD OF FORMING A FRICTION DISC MEMBER

[75] Inventor: Anthony Mannino, Jr., Lombard, Ill.

[73] Assignee: Borg-Warner Corporation, Chicago, Ill.

[21] Appl. No.: 650,572

[22] Filed: Jan. 19, 1976

[51] Int. Cl.² .................. B21D 31/02; B21D 28/22
[52] U.S. Cl. .......................................... 72/329; 72/336; 72/354; 113/116 D
[58] Field of Search ............... 72/327, 332, 333, 325, 72/113, 116, 329, 336, 354; 83/19, 14, 21; 113/116 D

[56] References Cited

U.S. PATENT DOCUMENTS

| 3,129,744 | 4/1964 | Payne | 72/327 |
| 3,442,110 | 5/1969 | Walton et al. | 72/327 |
| 3,760,921 | 9/1973 | Gillespie | 113/116 D X |
| 3,763,543 | 10/1973 | Strauch et al. | 72/113 X |
| 3,776,016 | 12/1973 | Quinn et al. | 72/333 X |

*Primary Examiner*—Travis S. McGehee
*Assistant Examiner*—Horace M. Culver
*Attorney, Agent, or Firm*—Herman E. Smith

[57] ABSTRACT

A method of forming a friction disc having projecting teeth including load bearing edge faces, in which one or more surfaces of the disc is indented to reform the edge faces while confined within a die cavity.

1 Claim, 14 Drawing Figures

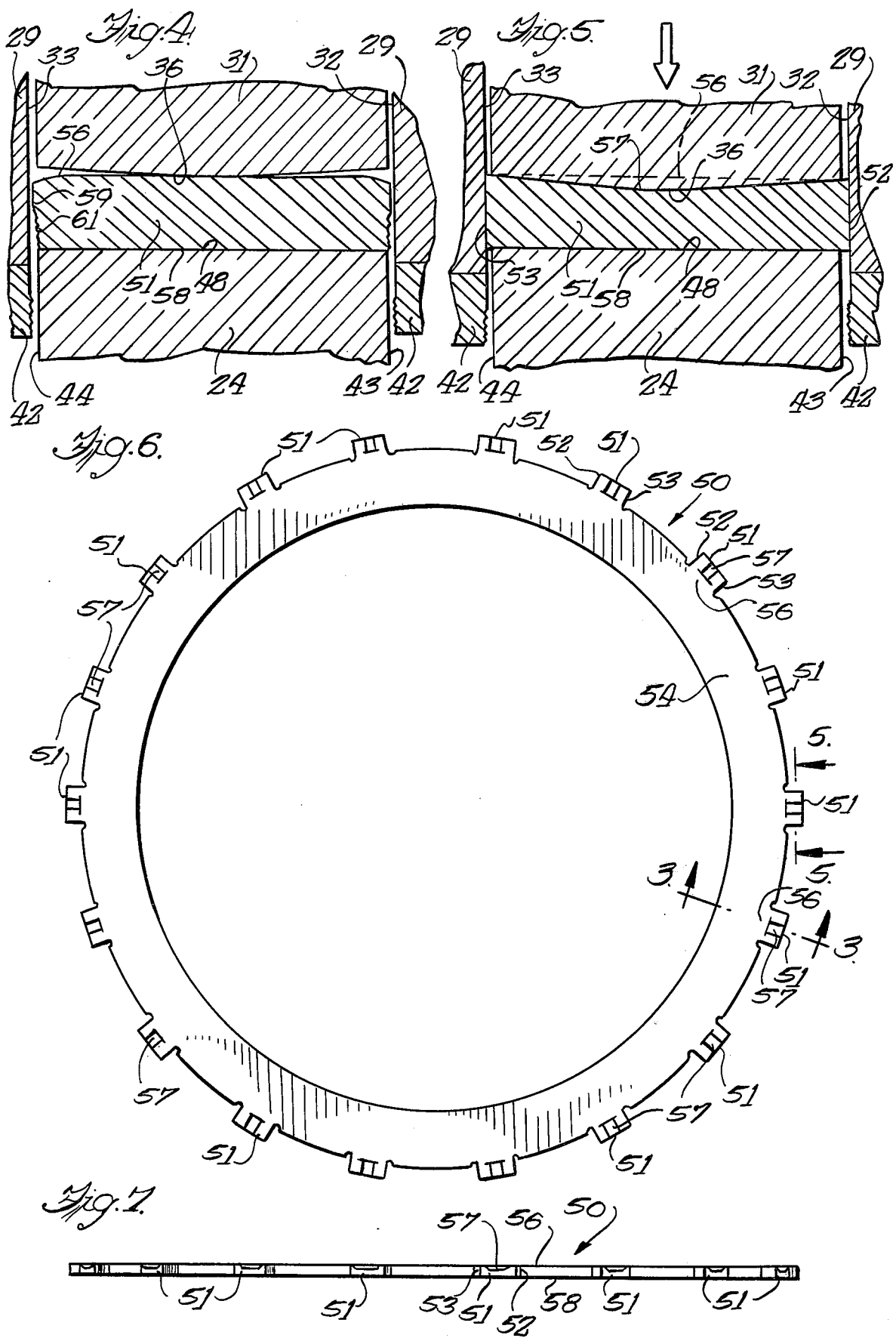

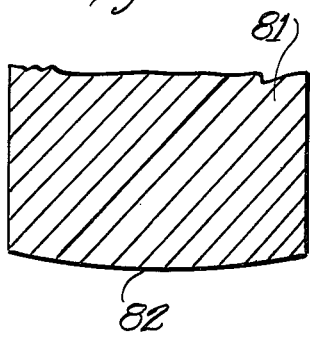
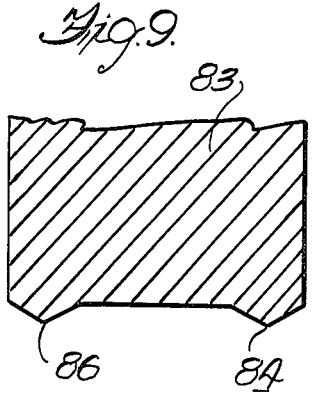
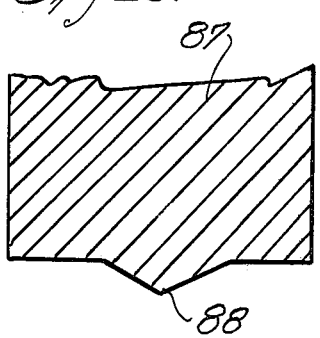
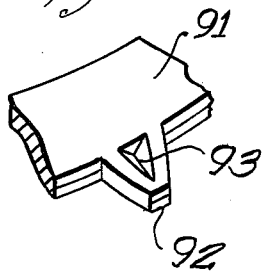
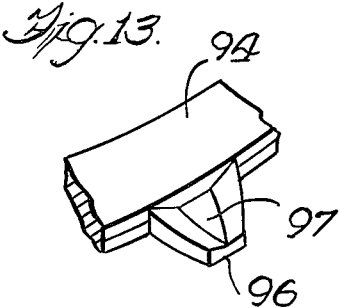
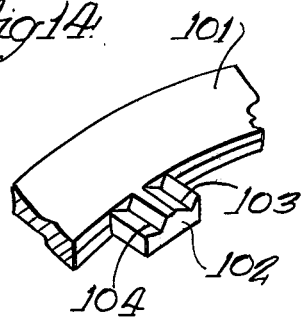
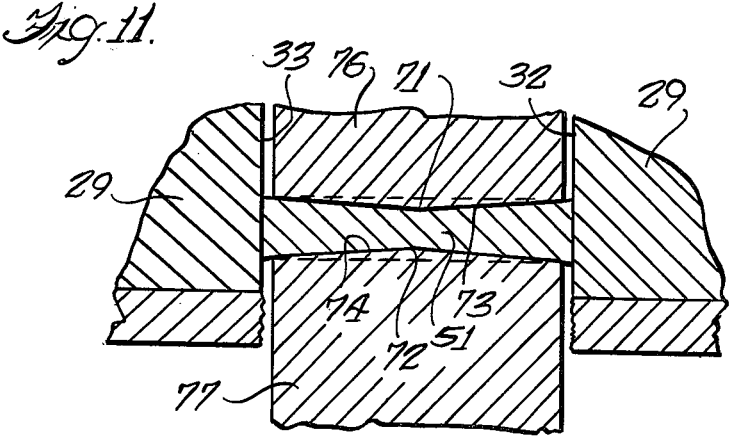

METHOD OF FORMING A FRICTION DISC MEMBER

BACKGROUND OF THE INVENTION

1. Field

The present invention relates to a method of forming a friction disc member, such friction members being useful as a component of a clutch or brake assembly. For example, such a clutch or brake assembly may include coaxial input and output members having a pack of annular friction discs arranged therebetween. Certain of the disc members normally have outwardly projecting teeth while others have inwardly projecting teeth for engaging splined surfaces in the input and output members. Alternate discs may have a friction material secured thereto.

2. Prior Art

It is known to form friction discs by a stamping operation in which an annular disc with projecting teeth is punched from sheet metal stock by means of a die set. In such a case, a portion of the edges of the teeth usually remain roughened and beveled with respect to a surface of the blank, whereas it is desirable to provide a smooth edge perpendicular to the surface of the disc for load bearing engagement with mating spline teeth. In order to provide smooth perpendicular edges on the teeth of a disc, the disc may be subjected to an additional finishing operation in which the edges of the teeth are subjected to shaving or upsetting to provide load bearing face for engagement with a spline. The additional operation of shaving or upsetting the faces of the teeth results in additional expense in manufacturing the disc.

SUMMARY OF THE INVENTION

The present invention is directed to a method of forming a friction disc by means of a stamping operation in which portions of the edges of the teeth are reformed to provide suitable load bearing faces. In somewhat more detail, the present invention contemplates shearing a disc blank from a piece of stock, and reforming edges of the teeth by indenting a surface of the disc while confined within the blanking die. Further, the invention contemplates employing a portion of the die set normally used for ejecting the blank from the die cavity for the additional purpose of forming indentations in a surface of the disc, such that a disc having finished load bearing faces on the teeth can be formed in a single stroke of a punch press.

BRIEF DESCRIPTION OF THE DRAWINGS

FIG. 4 is an enlarged fragmentary section view of a tooth confined within a die cavity;

FIG. 5 is a view similar to FIG. 4 showing a pair of spaced reformed tooth faces;

FIG. 6 is a plan view of an annular friction disc formed by the method of the present invention;

FIG. 7 is a side view of the friction disc shown in FIG. 6;

FIGS. 8, 9, 10 are fragmentary section views of tools for producing alternative indentation patterns;

FIG. 11 is a view similar to FIG. 5 showing indentation of opposite surfaces of a disc; and FIGS. 12, 13 and 14 are fragmentary perspective views of friction disc teeth showing optional indentation patterns.

DESCRIPTION OF THE PREFERRED EMBODIMENTS

Figure 1:
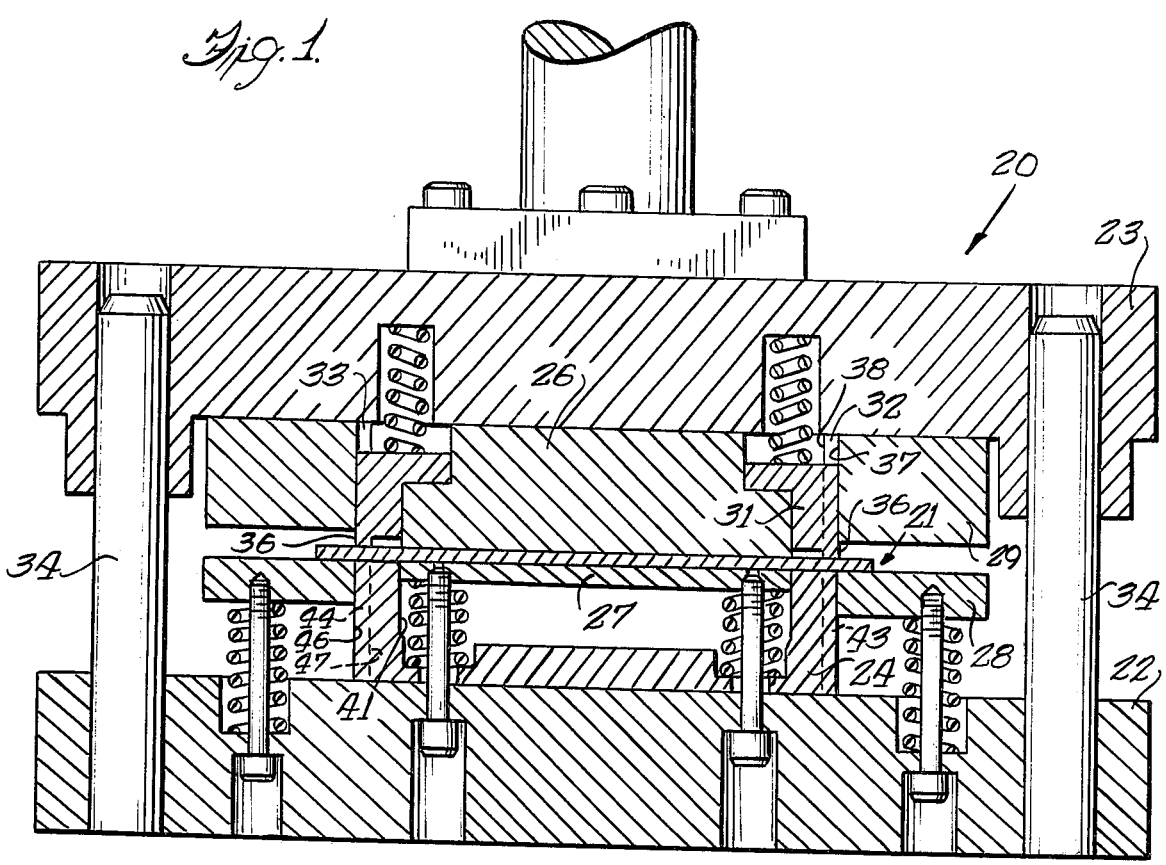
FIG. 1 is a section view of a compound die set suitable for use in performing the steps of the present invention.

Referring now in more detail to the drawings, a compound die set 20 and a piece of sheet metal stock 21 are shown in section in FIG. 1. The compound die set 20 includes a die shoe 22, a punch holder 23, a compound punch 24, an inside diameter punch 26, an inside diameter stripper 27, an outside diameter stripper 28, a ring die 29 and a shedder 31.

Ring die 29 includes an internal wall 37, 38 defining a die cavity having annularly spaced pairs of wall portions 32, 33 arranged to form a toothed pattern. Shedder 31 includes raised portions 36, 36 disposed within the ring die cavity between a pair of wall portions 32, 33. Guide pins 34, 34 extend from die shoe 22 into sliding engagement with punch holder 23 permitting closing movement of the die set, that is movement of punch holder 23 toward die shoe 22.

Closing of the die set 20 results in several forming steps which produces a friction disc 50 of the type shown in FIGS. 6 and 7 having a series of spaced teeth 51 extending from an annular portion 54. The projecting edge portions of the teeth have load bearing faces 52, 53 formed thereon. These forming steps are described in more detail hereinafter with reference to FIGS. 1 through 5.

Figure 2:
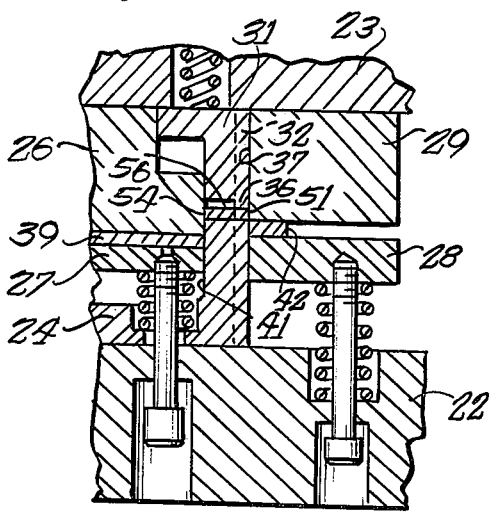
FIG. 2 is a fragmentary section view showing blanking of a friction disc.
Figure 3:
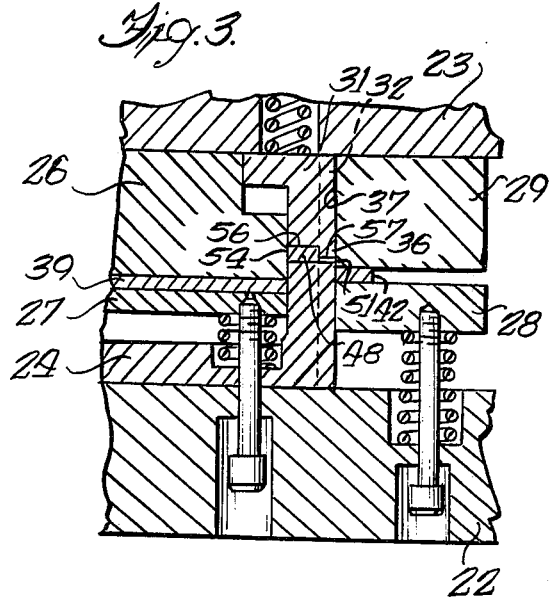
FIG. 3 is a fragmentary section view showing indentation of a surface of a friction disc.

During closing of die set 20, an initial increment of closing movement forces the inside diameter punch 26 through the sheet of stock 21 thereby shearing an internal piece of excess stock 39 into the cavity 41 of compound punch 24. Further incremental closing movement of die set 20 forces ring die 29 through stock 21 thereby removing an external piece of excess stock 42. The cooperation of ring die cavity wall portions 32, 33, 37, 38 with corresponding wall portions 43, 44, 46, 47 of compound punch 24 produces the friction disc 50 including the annular portion 54 and tooth portions 51. The blanking of disc 50 is shown in FIG. 2 wherein the raised portions 36 of shedder 31 rest on upper surfaces 56 of the teeth. As shown in FIG. 3, further incremental movement of the die set forces raised portions 36 of shedder 31 into surface 56 forming an indentation 57 therein. Upon subsequent opening of die set 20, the spring loaded strippers 27, 28 eject the pieces of excess material 39 and 42 from the die set, and spring loaded shedder 31 ejects the disc 50 from the ring die cavity 32, 33, 37, 38. FIGS. 2 and 3 include a section of disc 50 taken along the line 3—3 of FIG. 6.

In order to further illustrate the blanking step of FIG. 2 and the identation step of FIG. 3, the enlarged fragmentary views 4 and 5 are included, these views being taken at right angles to the views of FIGS. 2 and 3 showing a section of a tooth 51 taken along the line 5—5 of FIG. 6.

The blanking as shown in FIG. 4, results in sheared and fractured portions on the edges of teeth 51. A sheared portion 59 is substantially perpendicular with respect to the plane of the disc and may extend from upper surface 56 approximately 40 percent of the thickness of the disc, for example. A fractured portion 61 is generally rough and is somewhat beveled with respect to the lower surface 58 of the disc.

The step of indenting as indicated in FIG. 5, results in lateral displacement of the projecting edges of the teeth into contact with wall portions 32, 33 of the cavity in ring die 29. The squeezing of a tooth 51 and spreading of the projecting edges into contact with the wall portions of the ring die, reform the sheared and fractured portions 59, 61 to provide smooth load bearing faces 52, 53 which are substantially perpendicular to planar surfaces of the disc 50.

In the form of the invention illustrated in FIGS. 1 through 7 the step of indentation is performed on the top surface 56 of the disc while the lower surface 58 rests on a planar surface 48 of compound punch 24. In an alternate form of the invention the lower surface of a tooth may be indented or both the upper and lower surfaces may be indented as indicated in FIG. 11. In FIG. 11, a tooth 51 is shown confined within wall portions 32, 33 of the cavity in ring die 29 while the upper and lower surfaces are indented as indicated at 71, 72 by means of raised portions 73, 74 on a shedder 76 and punch 77.

Alternative embodiments of indentation are indicated in FIGS. 8, 9 and 10 wherein the indenting tool 81 includes a curved raised portion 82, the indenting tool 83 includes a pair of spaced V-shaped raised portions 84, 86, and the tool 87 includes a centrally disposed V-shaped raised portion 88.

In FIG. 12, there is shown a fragment of a disc 91 having an external involute shaped tooth 92 including a central indentation 93. FIG. 13 shows a fragment of a disc 94 having an involute shaped external tooth 96 including an indentation 97 which extends to the edges of the tooth. FIG. 14 shows a fragment of a disc 101 having a substantially rectangularly shaped internal tooth 102 including a pair of spaced V-shaped indentations 103, 104 formed in a surface thereof.

As indicated by these fragmentary views of alternative embodiments, the indentation may be formed in either the upper or lower surface of the disc or both, and may be used with internal or external teeth, and with rectangular or involute teeth. The depth and location of an indentation is selected to be near an edge portion which is to be reformed, and may take various shapes in accordance with the size and shape of the tooth.

I claim:

1. The method of forming a friction disc member having circumferentially spaced teeth including pairs of spaced load bearing edge portions, including the steps of shearing excess material from a piece of sheet metal stock to define said disc member confining said disc member within a die cavity having wall portions adjacent said load bearing edge portions of said teeth, urging a shedder having a pattern of projections formed thereon into penetrating engagement with planar surfaces of said teeth between pairs of edge portions thereby spreading said pairs of edge portions on each tooth into engagement with said adjacent wall portions of said die cavity to form properly sized teeth with pairs of spaced, smooth load bearing edge faces, and moving said shedder with respect to said die cavity for ejecting said disc member from said die cavity.

* * * * *